US006672174B2

(12) United States Patent
Deconde et al.

(10) Patent No.: US 6,672,174 B2
(45) Date of Patent: Jan. 6, 2004

(54) FINGERPRINT IMAGE CAPTURE DEVICE WITH A PASSIVE SENSOR ARRAY

(75) Inventors: Keith T. Deconde, San Jose, CA (US);
Srinivasan K. Ganapathi, Fremont, CA (US); Randolph S. Gluck, San Jose, CA (US); Steve H. Hovey, Goleta, CA (US); Shiva Prakash, Santa Barbara, CA (US); Robert Dobkin, Monte Sereno, CA (US)

(73) Assignee: Fidelica Microsystems, Inc., Milpitas, CA (US)

( * ) Notice: Subject to any disclaimer, the term of this patent is extended or adjusted under 35 U.S.C. 154(b) by 0 days.

(21) Appl. No.: 09/912,066

(22) Filed: Jul. 23, 2001

(65) Prior Publication Data

US 2003/0015646 A1 Jan. 23, 2003

(51) Int. Cl.⁷ .................................................. G01D 7/00
(52) U.S. Cl. .................................................. 73/862.046
(58) Field of Search ....................... 73/862.046, 862.41, 73/862.042, 862.45

(56) References Cited

U.S. PATENT DOCUMENTS 4,207,444 A  *  6/1980  Kley ........................... 200/5 A
4,317,013 A  *  2/1982  Larson ......................... 200/5 A
5,016,481 A  *  5/1991  Jacobsen et al. ........ 73/862.625
5,844,287 A  * 12/1998  Hassan et al. ............... 257/419
6,049,327 A  *  4/2000  Walker et al. ............... 345/158
6,497,430 B1 * 12/2002  Odom et al. ................. 280/735

FOREIGN PATENT DOCUMENTS

| EP | 0 769 754 | 4/1997 |
| WO | WO 94/25938 | 11/1994 |
| WO | WO 97/17668 | 5/1997 |
| WO | WO 00/06023 | 2/2000 |

* cited by examiner

Primary Examiner—Max Noori
(74) Attorney, Agent, or Firm—Pillsbury Winthrop LLP

(57) ABSTRACT

A fingerprint-sensing device with a sensor array that does not use active switching elements is fabricated on a base. Sensor support integrated circuits, which contain processing and addressing circuitry, are separately fabricated and subsequently mounted on the base, establishing electrical connections with an interconnect structure within the base, and are thus not integrated with the sensor array. The sensor support integrated circuits can be covered by a bezel structure and the sensor array by a covering material. In addition, a connection cable can be provided to connect the sensor array and the sensor support integrated circuits with a power source and to other external devices and to convey signals generated by the sensor array to the external devices.

38 Claims, 10 Drawing Sheets

FINGERPRINT IMAGE CAPTURE DEVICE WITH A PASSIVE SENSOR ARRAY

BACKGROUND

1. Field of the Invention

The invention relates generally to devices that sense textures and represent them using signals. More specifically, the invention relates to devices that sense fingerprints and other textured surfaces allowing them to thereby be represented as images.

2. Related Art

The fingerprint image sensing industry uses two prominent technologies to capture images of an individual's fingerprints for use in electronic security applications—(1) optical-based sensors, and (2) capacitance-based sensors. By design, most, if not all, such sensors employ a small-sized two-dimensional array of elementary sensor cells on a silicon chip. When a finger is placed on this small-sized sensor array, electronic circuitry scans each sensor cell in the sensor array for an applicable output. The output from each cell is a measure indicative of the distance between the fingerprint features (such as ridges) and the sensor cell at that location. A composite map of these distances translates into and represents an image of the fingerprint.

In order to be able to scan each cell of the sensor array during the acquisition of a fingerprint image, CMOS (Complementary Metal-Oxide Semiconductor)-based active switching devices (such as transistors or diodes) are placed at each cell, thus making the sensor array an "active" device built on a silicon substrate. In addition, other CMOS-based addressing circuitry, such as row and column multiplexers, are often used to selectively address each row and each column of the sensor array. In addition, to process and transmit the resultant signals, still other CMOS circuitry, such as amplifiers, voltage comparators, and A/D (Analog-to-Digital) converters, must also be included. Typically, these addressing and processing electronics are also integrated onto the same silicon substrate chip outside the area of the active sensor array.

One significant drawback of the above-mentioned silicon-based sensor arrays and the associated addressing and processing circuitry is the cost involved in integrating these on the same substrate. The size of the active array, and hence the size of the sensor chip, must be large enough to accommodate the size of a normal fingerprint and the additional circuitry. Consequently, the sensor chip dimensions become large, typically on the order of 15 mm by 15 mm. Since silicon chip processing is conducted on silicon wafers that are typically 150–200 mm in diameter, relatively few sensor chips can be obtained from a single wafer. As a result, the cost of each sensor chip can be significant. This cost prevents deploying such fingerprint sensors into security devices employed in consumer devices such as computers, wireless and hand-held devices, internet appliances, and in other physical access control applications, which are all very cost sensitive. In addition, most of the sensors that use CMOS type processing for the sensor array and associated electronics are adversely affected by ambient environmental conditions at the time of sensing and also by electrostatic discharge (ESD), if any.

What is needed is an apparatus employing a small sensor that fits into most consumer electronics and other applications while remaining inexpensive enough to match the low cost requirements of a mass market.

SUMMARY OF THE INVENTION

In one embodiment of the invention, a fingerprint-sensing device includes a sensor array that does not use active switching elements fabricated on a base that also includes an interconnect structure. Sensor support integrated circuits that provide processing and addressing circuitry are formed separately and then bonded to the base using the interconnect structure to ensure proper electrical connections. Thus, the processing and address circuitry is not integrated with the sensor array, but is electrically connected to it using conductive paths that make up the interconnect structure within the base. In one embodiment, the processing and addressing circuitry contains two separately formed sensor support integrated circuits that are placed on the base adjacent to the edges of the sensor array formed thereon. Various signals are communicated to and from the sensor support integrated circuits using the interconnect structure within the base from the sensor array. In addition, to communicate to a power source and to other external devices, a separate cable may be attached to the base and electrically connected to one or more of the sensor support integrated circuits. Alternatively, the sensor array may be formed as a distinct semiconductor circuit and then attached to a separate base.

In one embodiment of the invention, the sensor array uses a two-dimensional array of cells, each of which preferably contains only passive elements.

In other embodiments, the sensor support integrated circuits can be covered by a bezel structure, and the sensor array can be encapsulated with a covering material.

DETAILED DESCRIPTION OF THE PREFERRED EMBODIMENTS OF THE PRESENT INVENTION

Figure 1A:
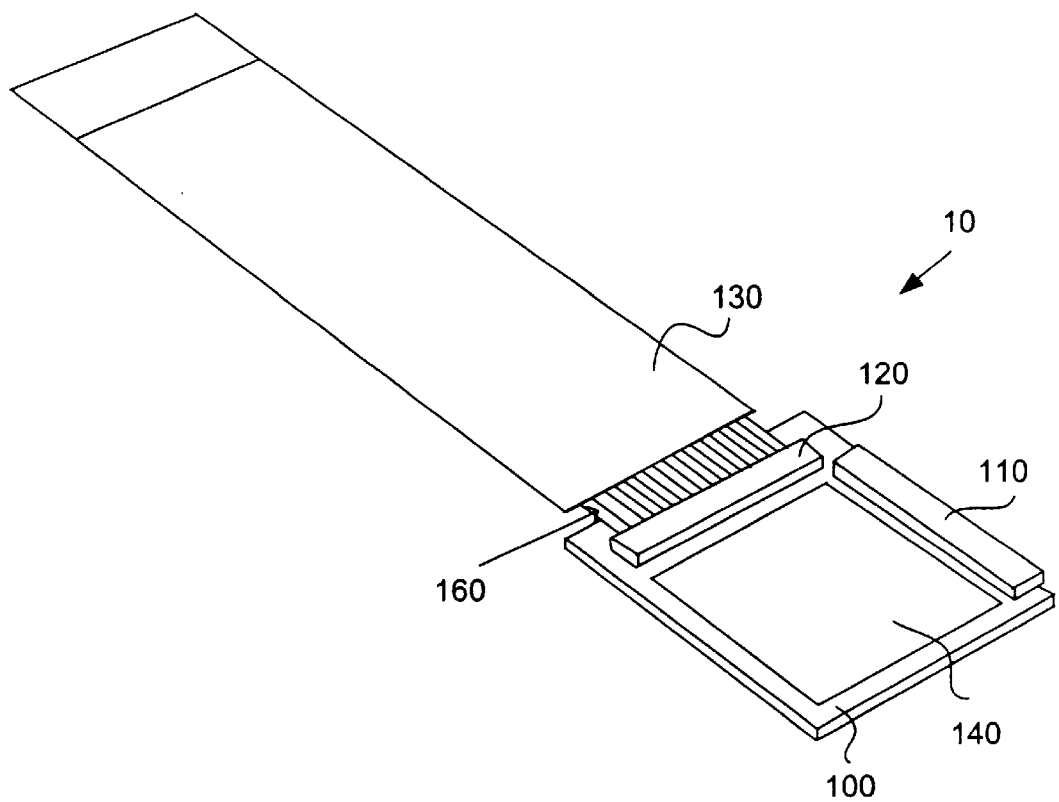
FIGS. 1A and 1B illustrate a top perspective view and a cross sectional view of a fingerprint-sensing device according to at least one embodiment of the invention.

In brief, the invention consists of separating a fingerprint-sensor array that converts a fingerprint into resultant signals completely from sensor support integrated circuit(s) that contain addressing and processing circuitry used to address cells within the sensor array and process signals that are obtained which correspond to the textured surface placed upon the sensor array. The detected and processed signals can then be transmitted to other external devices without suffering from inordinate attenuation and thus become unusable in subsequent image processing that allows a fingerprint image to be rendered from the resultant signals. The sensing structure, which includes the sensor array and the base, with the corresponding interconnect structure therein, is fabricated independent of the sensor support integrated circuit(s) that contain the addressing and processing circuitry. The sensor array, in one embodiment, is composed of rows and columns of individual sensing cells, with one preferred embodiment containing 256 cells in each row, and 256 rows, for a total of 65,536 cells. The sensor support integrated circuits are also fabricated independently from fabrication of the sensor array, but are electrically connected to sensor array via the interconnect structure formed on the sensing structure and physically connected to the sensing structure so that they do not interfere with the sensor array.

In one embodiment, the addressing and processing circuitry is distributed into two separate sensor support integrated circuits. The first of these sensor support integrated circuit devices is placed on one the base adjacent to the one edge of the sensor array and addresses one of the rows or columns of the sensor array and processes signals obtained from the sensor array as a result of a finger being applied thereto and a fingerprint being detected. The other, second, of these sensor support integrated circuit devices is placed on another edge of the sensor array, typically perpendicular to the edge of the sensor array to which the first sensor support integrated circuit is disposed, and addresses the other of the row or columns of the sensor array. Each of these sensor support integrated circuit devices is electrically connected to the sensor array using the interconnect structure that exists within the base to provide for electrical conduction. The interconnect structure includes contact pads on the base, to which corresponding contact pads on the sensor support integrated circuits are electrically connected. In addition, a cable is also connectable to cable contact pads disposed within the interconnect structure on the base, and the interconnect structure allows electrical connections between the cable, the sensor array and the sensor support integrated circuits. The cable is then used in communicating with host electronics and other external devices as described hereinafter. The description below refers to the "top" of the sensor array as being the side upon which a fingerprint can be placed and sensed by the fingerprint-sensing device. Conversely, the "bottom" of the sensor array is that side which is not exposed to receive a finger and which can attach to some other structure.

Preferably, the sensor array is "passive," and thus, does not require the use of active switching devices (such as transistors, diodes etc.) at each individual location in order for the sensor array to be scanned. Such an embodiment has the advantage of the choice substrate material for the sensor array not being limited to silicon or other semiconductor material, and allows the use of glass, plastic, or any other suitable material. Glass, plastic and other substrates are usually available in large form factors allowing several hundred or more sensing structures to be manufactured on the same wafer or panel, thus reducing the unit cost. This allows deployment of the fingerprint-imaging device using the sensor array into cost-sensitive applications, particularly those for mass market. One additional advantage is that the separate fabrication of the fingerprint-sensor array and associated addressing and processing circuitry allows improved ESD characteristics. This is because the active CMOS circuitry used on the sensor support integrated circuits containing the addressing and processing circuitry, which is most susceptible to ESD-induced failure, is separate from the sensor array rather than a part of it. Also, the separation of the sensor array from the addressing and processing circuitry permits the size of the sensor array to be reduced (since it is not integrated therewith).

Figure 1B:
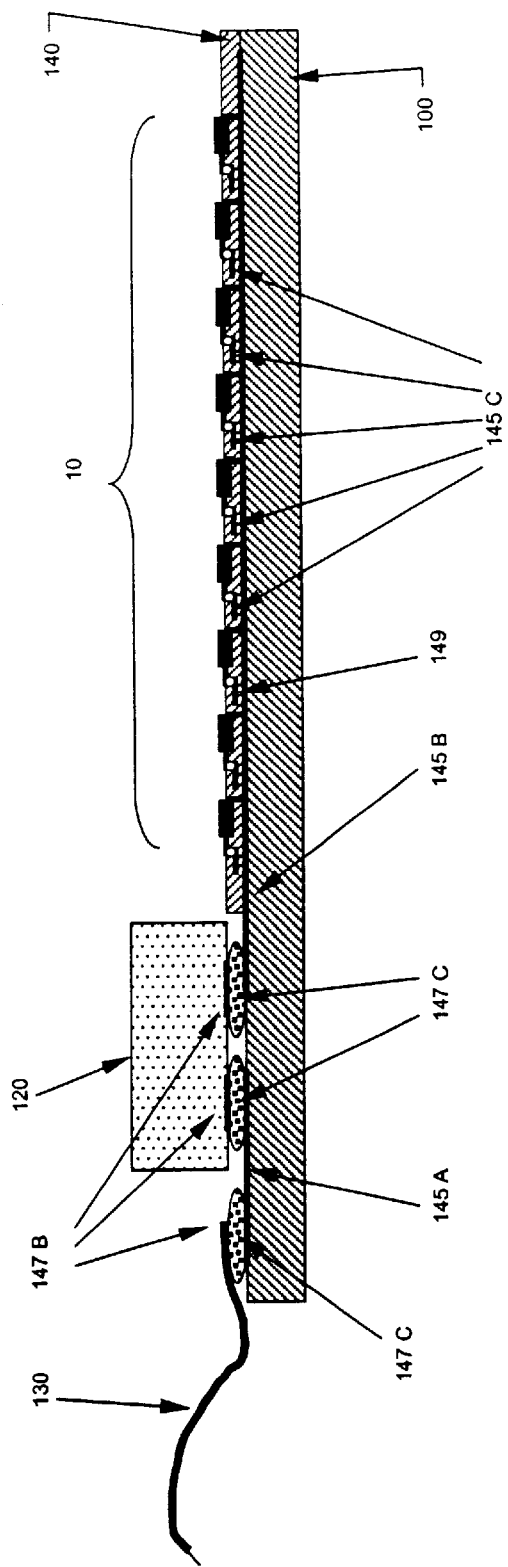

FIGS. 1A and 1B illustrate top perspective and cross sectional views of a fingerprint-sensing device according to at least one embodiment of the invention. The fingerprint-sensing device 10 has a base (such as a wafer or panel substrate) 100, and a sensor array 140 is either built into or placed upon that base 100. The sensor array 140 occupies a substantial fraction of the total area available to the base 100 in the preferred embodiment of the invention, but does not occupy the entire area. The base 100 also contains an interconnect structure 145, including buried conductor interconnect leads 145A from the cable 130 to the integrated circuit devices 110 and 120, the buried conductor column conductor interconnect leads 145B and the buried row conductor interconnect leads 145C. Contact pads 147A are disposed at appropriate locations on the top surface of the base 100 to electrically connect to corresponding contact pads 147B on the two sensor support integrated circuit devices 110 and 120 and the cable 130, through a conductive bonding material 147C, to establish an electrical connection with the interconnect leads 145. Also shown as insulator 149 is insulating layer or layers used to ensure that the various interconnect leads do not interfere with each other, such as, for example as shown, the insulator between the buried conductor row conductor interconnect leads 145B and the buried column conductor interconnect leads 145C. In one embodiment, devices 110 and 120 are positioned and attached to the base 100 at two edges of the sensor array 140 such that the devices 110 and 120 are adjacent to the sensor array 140 on the top surface of the base 100. The edges where integrated circuit devices 110 and 120 are attached are perpendicular to one another and lie along the same plane. The sensor array 140 is composed of a two-dimensional array of individual cells organized in rows and columns. In such a case, one of the two sensor support integrated circuit devices (such as device 110) can address the rows of the sensor array 140 and also processes signals obtained from the sensor array as a result of a finger being applied thereto and a fingerprint being detected, while the other (such as device 120) can address the columns of the array 140. The integrated circuit devices 110 and 120 preferably contain conventional CMOS circuits including multiplexers and other conventional circuitry for address different rows and columns of the array. In addition, devices 110 and 120 may use other analog circuitry, and digital logic to implement other features, such as the state of the cell being addressed, and the state of the sensor array (whether or not a finger has been placed on it during operation).

Fingerprint sensing device 10 is characterized by the distributed and separated nature of the sensor support integrated circuit devices 110 and 120 and the sensor array 140. It should be noted that it is equally possible for those skilled in the art that the two sensor support integrated circuits may be replaced by a single sensor support integrated circuit. Additionally, the separation of the sensor support integrated circuit devices 110 and 120 from the sensor array 140 allows the sensor array integrated circuit 140 itself to be of a flexible nature. For instance, in one embodiment of the invention, the sensor array integrated circuit 140 contains passive, rather than active, switching devices, and, with the absence of active devices, the integrated circuit 140 can be made thinner, and flexible. In the passive case, the sensor array would contain no diodes or transistors within it.

In other embodiments, the sensor array 140 could instead be active, containing active switching devices, such as transistors, especially at the intersections of the rows and columns that address each individual cell in the array 140.

Figure 1C:
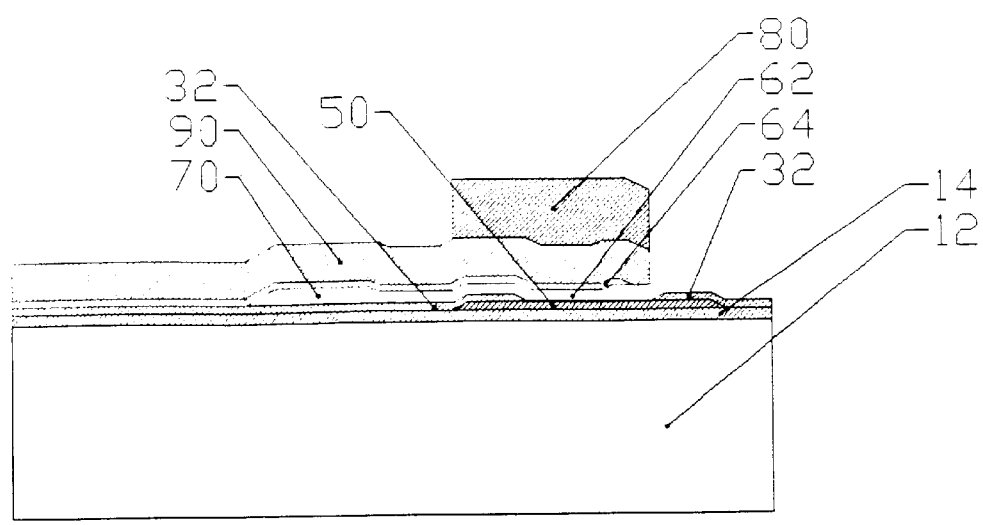
FIGS. 1C and 1D illustrate a cross sectional view and a top view of a cell of the sensor array according to a preferred embodiment of the invention.
Figure 1D:
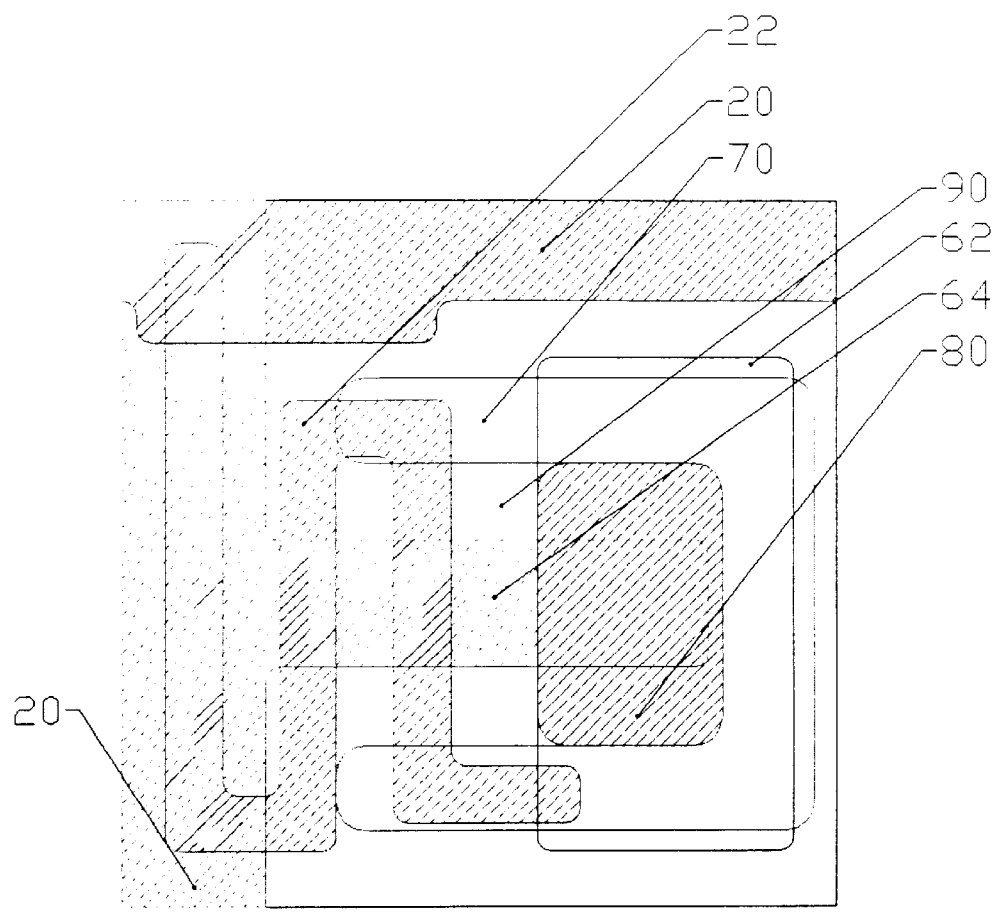

In one passive sensor array embodiment, each individual sensing cell in the array 140 uses a force sensing apparatus that includes at least one lithographically patterned sensor. Each force-based sensing cell has a cantilever or a simply suspended bridge or membrane in contact with a first conducting electrode that deforms under the load applied by the localized ridge of the fingerprint. This deformation brings the conducting electrode in contact with a second conducting electrode that is initially separated and insulated from the first conducting electrode. The contact between the two electrodes closes an electrical circuit allowing a current to flow under the application of an external voltage. The presence or absence of this current can be used to determine the presence or absence of a finger ridge and thus acts to image a feature of the fingerprint. A scan of all sensing cells in the sensor array 140 in this manner then generates a fingerprint image. This is discussed in more detail in U.S. patent application Ser. No. 09/571,765, for "Method and Apparatus for Pressure Sensing," filed May 16, 2000 (hereinafter, "Pressure Sensing Patent"). FIGS. 1C and 1D herein illustrate a preferred passive sensing cell in cross section and top view, respectively. Illustrated are substrate 12, insulator 14, leads 20, resistor 22, insulating layers 32, lower electrode 50, an upper electrode 60 that includes a lower sacrificial layer 62 that is removed and an upper layer 64 that becomes the upper electrode in use, a well release layer 70, conductor structures 72, button 80, and the cantilever beam 90. As described in the '765 patent application, associated with each cell is a large resistance producing device, in the range of 5,000–500,000 ohms, which, in conjunction with a pull down resistor to ground on each row, allows for a single cell to be sensed despite the other cells providing current leakage paths when they are depressed simultaneously under the action of a fingerprint thereby allowing for the detection of the signal under conditions that would not otherwise be possible. It is understood, however, that the base on which the present invention is made is modified from the base illustrated in that application, as described herein, in order to accommodate the sensor support integrated circuit devices described herein.

Figure 1E:
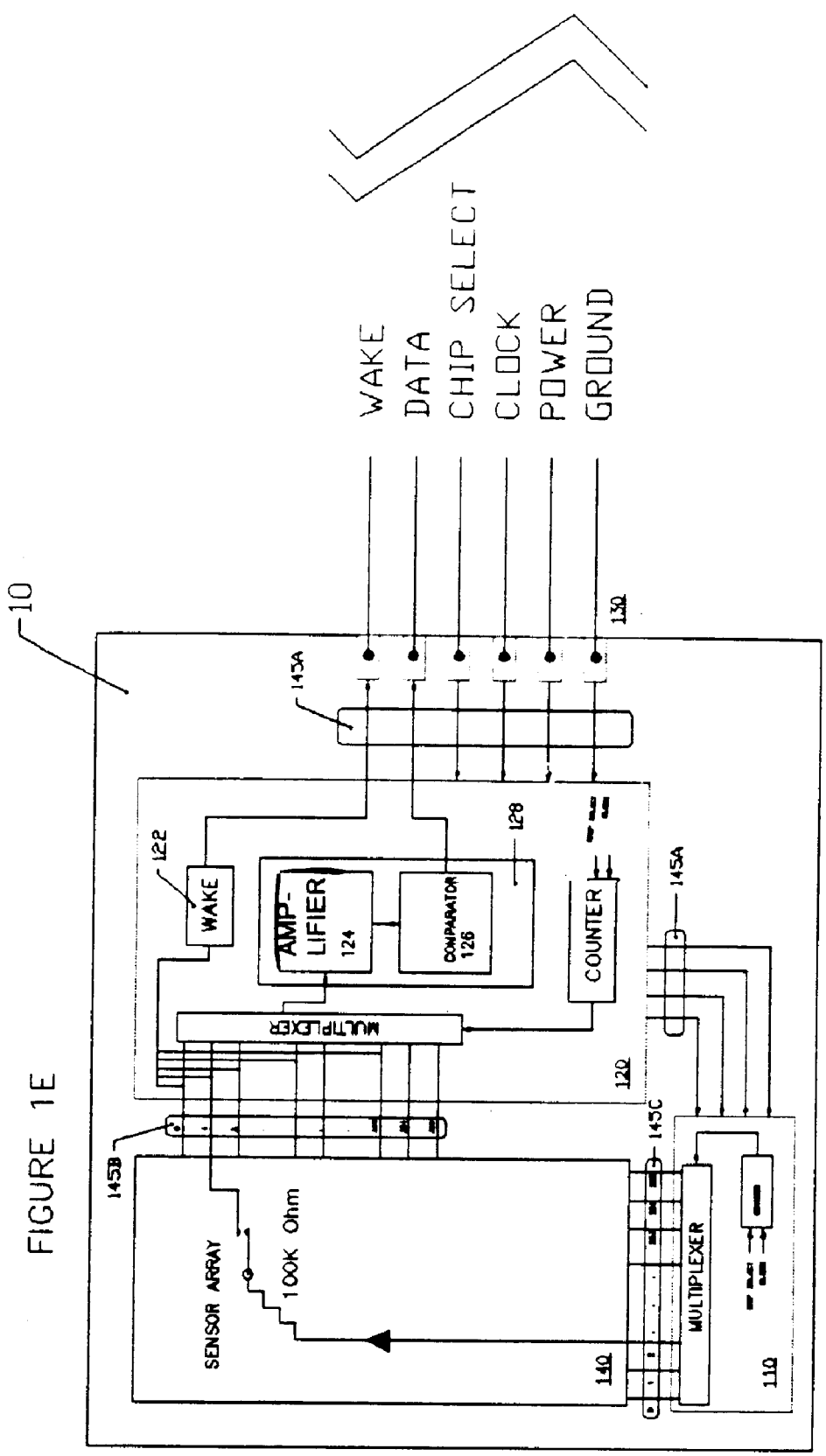
FIG. 1E illustrates a schematic block diagram of a fingerprint-sensing device according to the present invention.

FIG. 1E illustrates a schematic block diagram of a fingerprint-sensing device according to the present invention. As shown, the various power, ground and clock lines are distributed from the cable 130 to the interconnect structure 145 within the base 100, and thereby are distributed to the sensor support integrated circuit devices 110 and 120.

While operation in a number of manners is possible, such as an always on state that continuously detects whether a fingerprint it being applied for sensing, it is preferable for a wake circuit 122, disposed in one of the sensor support integrated circuit devices, typically the row (or sense) sensor support integrated circuit, that detects an initial depressing of a finger on the sensor array. The wake signal is generated as the accumulation of the state of a number of different cells, preferably a subset of the entire number of cells, such as 8 rows and 8 columns. When a voltage is applied to each column, the corresponding current to ground that is output from the sensor array can be sensed, such that if no current flows, this indicates that no pressure has been applied, but if current flows, this indicates that pressure has been applied to at least some of the cells, and thus that detection should occur. The wake signal will cause, in the external host device, a chip select signal, which will then cause conventional address decoder circuitry, for example using a counter that counts the clock cycles from the input clock and a multiplexer, in each sensor array support integrated circuit 110, 120 to scan each of the sensors on the sensor array, in order to obtain an output signal corresponding to each sensor on the sensor array. The current address is used as a select input to the multiplexer in corresponding sensor support integrated circuit 110, 120. The selected multiplexer output is used in the column (or drive) sensor support integrated circuit 110 to place a voltage on the appropriate column. The selected multiplexer output on the row (or sense) sensor support integrated circuit 120 will cause only one output signal line from the sensor array to be connected to processing circuitry 128 at a time. The output signal lines from the sensor array 140 are distributed through the interconnect structure 145 and the length thereof is kept to a minimum, as shown. The signal output from the sensing array that is selected by the decoder, again shown as a multiplexer and a counter, on the column sensor support integrated circuit 120 is then amplified using amplifier 124 and then compared to a reference signal at comparator 126, with the output from comparator 126 then being distributed through the interconnect structure 145 to the cable 130, for usage with external devices.

In a passive switching embodiment, when the switch is closed at a sensing cell under the presence of a ridge of a fingerprint, the higher current flows through a current to voltage amplifier 124. This increased voltage is compared with a reference voltage using a comparator 126. If the voltage from the amplifier is greater than the reference, the comparator outputs a digital "1", and if the voltage is lower (as it will be if the sensing cell is under a valley of the fingerprint, and the switch does not close), it will output a "0". Thus the digital output of "1s" and "0s" of the processing circuitry is a map of the ridges and valleys of the fingerprint image. A covering material (not shown) encapsulates the sensor array completely so that the internal structures of the sensing cells avoid possible environmental damage or contamination/wear due to contact from finger tissue during sensing.

The sensor support integrated circuit devices 110 and 120 can be attached in a variety of ways, dependent in part upon the material chosen for the base 100 and the configuration of the sensor array 140. Preferably, as described hereinafter, the sensor support integrated circuit devices 110 and 120 are attached directly to the base at contact pads that are part of the interconnect structure 145 within the base, as illustrated in FIG. 1B and described in further detail below. Alternatively, the sensor support integrated circuit devices 110 and 120 could be attached by means of cables or other connectors that attach to the base 100. In either case, it is desirable to keep the overall "height" profile of the combined assembly (either the sensor support integrated circuit devices (110 and 120) as placed on the base 100, or via a cable on the base 100) to a minimum, since this affects the placement of the finger on the device assembly, and reduces the total area of contact between the finger and the sensor array 140. The overall height is a function of the total thickness of the base/sensor array and the integrated circuit devices 110 and 120, either of which can be reduced if needed. Overall height may be important for fingerprint-sensing devices used in small portable devices such as PDAs and cell phones. However, from an image quality and size standpoint, it is of importance to reduce the thickness of the sensor support integrated circuit devices 110 and 120 or the flexible cable 130 that is attached on top, since a finger will partially sit on the back. By placing the flexible cable 130 or devices 110 and 120 farther away from the sensor array, the impediment posed by finger placement on the sensor can be minimized.

The devices 110 and 120 are integrated circuits, preferably formed using CMOS processing techniques. In one embodiment, device 110 which addresses the columns of the array (the "column device" as described herein) receives a signal, either through software or through a clock, that drives the column address decoder circuitry, which is conventional but can include, for example, a counter and a multiplexer as described above to determine the column to be addressed and to apply a voltage to the addressed column. During the same addressing, the other device 120 (the "row device" as described herein), in a manner similar to the column device, uses row address decoder circuitry to determine the row to be addressed, (or can receive a signal to address a specific row if the entire decoder is in the device 110), and connects the output corresponding to the addressed cell defined by the addressed column and addressed row to the processing circuitry, which processing circuitry will include, for example, the amplifier 124 and comparator 126 as noted above. A specific column address on the column device 110 and a specific row address on the row device 120 uniquely identify the individual sensor cell that is being addressed. The output of the addressed row is amplified using amplifier 124, and then input to the comparator 126, where it is compared with a reference voltage to verify whether it is a ridge ("1" value) or a valley ("0" value), which value is then transmitted back to a host/external device (connected by cable 130). Using either the clock or software commands as an input, the devices 110 and 120 scan through the entire array to create a full fingerprint sensor reading.

One manner of attaching the devices 110 and 120 to the base 100 (and to the sensor array 140), is to align contact pads 147B on each device 110 and 120, respectively, with contact pads 147A that form part of the interconnect structure 145 on the base 100, as shown in FIG. 1B, and then electrically connect the aligned contact pads with a conductive material 147C such as solder or conductive adhesive, which is conventionally known as a flip-chip process. The interconnect structure 145 then electrically connects, as appropriate, conductors in the sensor array 140 that make up the individual row lines and column lines with the contact pads on the base 100 to enable individual cell addressing of the sensor array 140. Non-conducting adhesive may be used to strengthen the attachment of the devices 110 and 120 to the base 100. Other attaching methods, different from a flip-chip process may be used, as desired, but should ensure conducting contact between each contact pad on the device and only the corresponding contact pad on the base, while keeping them isolated from all other pads. Some examples of other attachment processes that can be employed include wire bonding, solder bonding of cables, etc. Wire bonding, which is well-known in the art, involves building wire bridges between the sensor array 140 and the devices 110 and 120 and then bonding those bridges to form an electrical connection separate, flexible cable 130 is also electrically connected to the sensor array 140 and the sensor support integrated circuit devices 110 and 120 via the interconnect structure 145 within the base 100 to provide power, ground, clock, data in/data out and other connections to/from a host or other device. The flexible cable 130 may be attached by soldering or other methods that are well known, such as hot bar attach or "anisotropic conductive film" (ACF) attach. The flexible cable 130 also transmits the fingerprint image signals to such external devices. One exemplary implementation of the above sensing device can have the following dimensional characteristics:

Sensing device (without cable): ranges from 8–32 mm wide by 9–36 mm depth by 0.7–2.1 mm height. Optimally, about 16 mm wide by 18 mm depth by 1.4 mm height;

Sensor array: ranges from 6 mm by 6 mm up to 28 mm by 28 mm. Optimally, about 14 mm by 14 mm.

Individual cell: square with 25–100 microns per side; optimally about 50 microns per side;

Base: 0.2 mm–2 mm thickness; optimally about 0.7 mm thickness (height);

Cable attachment pads: optimally, about 1.2 mm by 0.8 mm by 3.5 micron thick.

The above dimensions are merely exemplary and are subject to variation, depending upon design, cost, construction, material and industry considerations.

Figure 2:
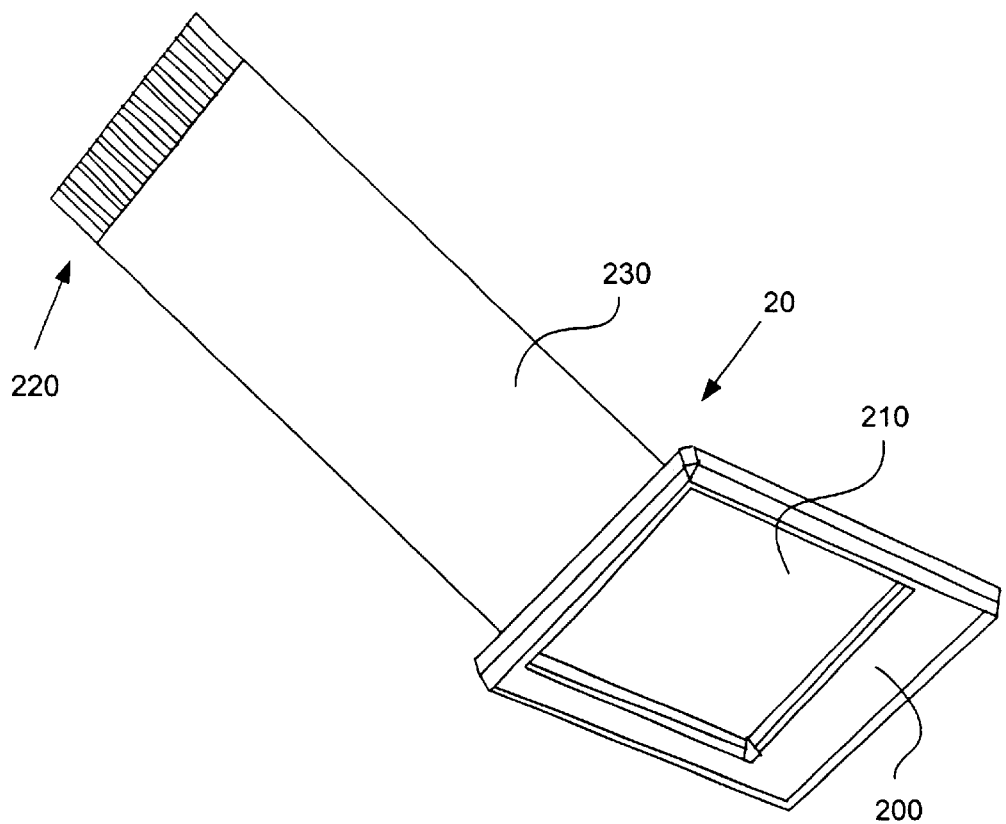
FIG. 2 illustrates a top perspective view of a fingerprint-sensing device with a bezel structure according to at least one embodiment of the invention.

FIG. 2 illustrates a top perspective view of a fingerprint-sensing device with a bezel structure according to at least one embodiment of the invention. A fingerprint sensing device 20 contains components similar to sensing device 10 (shown in FIG. 1) such as sensor support integrated circuit devices 110 and 120 and sensor array 140, but has these components covered from direct contact with the outside environment. The sensor support integrated circuit devices can be covered with a bezel structure disposed along all of the outer edges of the base 100 (shown in FIG. 1). The sensor array can also be covered by a thin covering 210. This allows a finger to be placed upon the covering 210 such that there is no direct contact with the sensor array beneath. The bezel 200 also acts as a guide for the placement of a finger during a sensor reading. Also, a flexible cable 230, which functions like cable 130 of FIG. 1, can be attached to the fingerprint sensing device 20 such that the contacts to the sensor support integrated circuit devices and sensor array are disposed beneath the bezel 200. The cable 230 is also shown as having a free end which has contacts 220 permitting connection to a host device or other external devices that may provide power and will also receive fingerprint image signals generated by fingerprint sensing device 20.

The composition of bezel 200 may be metal, plastic, ceramic or any suitable material. The bezel 200 can be affixed by means of clamping, molding, bonding or any appropriate method. The covering 210 should transmit the measured quantity (force, light, electric field, heat, ... ) with minimum attenuation or distortion. The choice of materials used is dictated by the quantity being measured/sensed and by the environmental and usage requirements. Typical material choices would include polymer-based materials such as plastics, elastomers, Teflon, acrylics, or combinations thereof.

Figure 3:
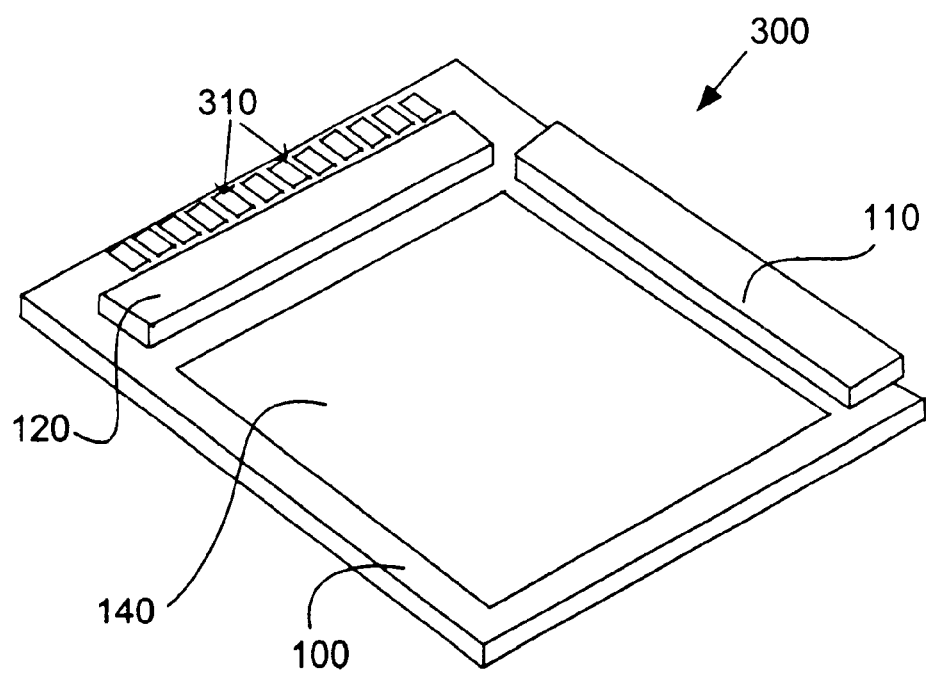
FIG. 3 is a top perspective view of the fingerprint-sensing device of FIG. 1 detached from the external cable according to one or more embodiments of the invention.

FIG. 3 is a top perspective view of the fingerprint-sensing device of FIG. 1 detached from the external cable according to one or more embodiments of the invention. The components 100, 110, 120 and 140 shown in FIG. 3 have been described above with respect to sensing device 10 of FIG. 1 and remain substantially the same. The detached device 300 shows on base 100 a set of contact pads 310. These contact pads 310 can be used to connect the device 300 to a flexible cable (as shown in FIG. 1) or can be used to snap the device in modularly to another device having a corresponding mating interface.

Figure 4:
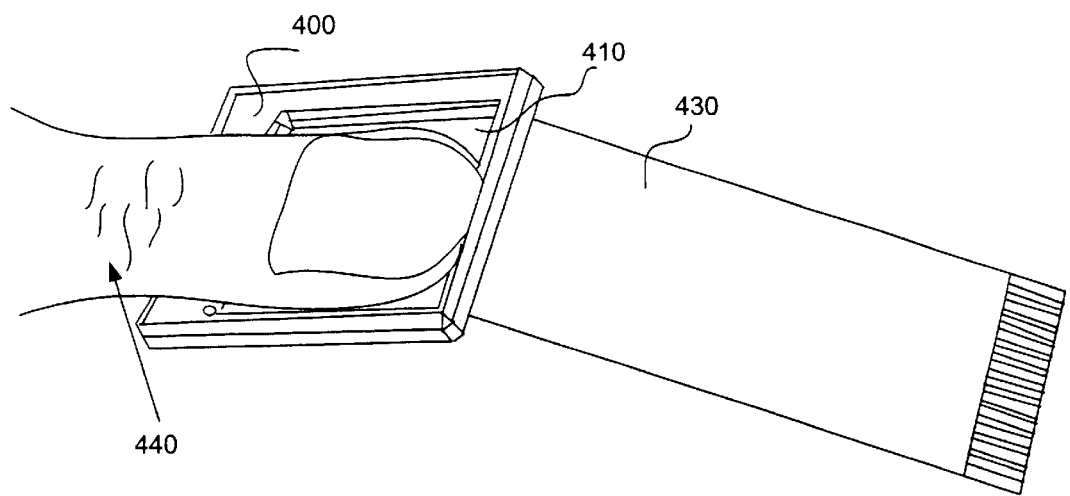
FIG. 4 illustrates the operation of a fingerprint-sensing device according to one or more embodiments of the invention.

FIG. 4 illustrates the operation of a fingerprint-sensing device according to one or more embodiments of the invention. The components bezel 400, covering 410 and cable 430 correspond to components 200, 210 and 230 of FIG. 2, respectively, and operate substantially the same thereto. When a finger 440 is placed and presses down upon the covering 410, the individual features of the fingerprint of finger 440 will be sensed in various cells of the sensor array under covering 410. The image of the fingerprint is represented by electrical signals generated by the cells of the sensor array. These signals can be transmitted to an external device by means of cable 430. The bezel 400 acts as a guide helping the user whose fingerprint is being imaged to place their finger on the sensing device correctly.

Figure 5:
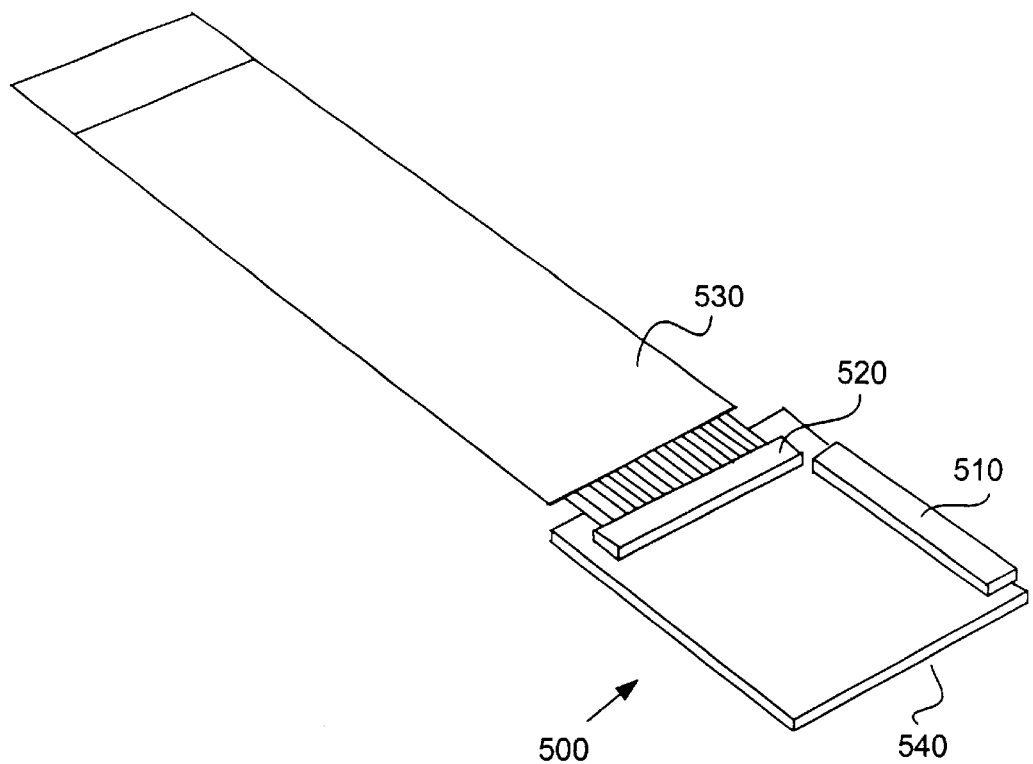
FIG. 5 is a bottom perspective view of a fingerprint-sensing device with components attached to the bottom side according to at least one embodiment of the invention.

FIG. 5 is a perspective view of a fingerprint-sensing device with components attached to the bottom side of the base, while the sensor array remains on the top side of the base, according to at least one embodiment of the invention. Fingerprint sensing device 50 also has sensor support integrated circuit devices 510 and 520 that are separate from the sensor array 540 they service. Sensor support integrated circuit devices 510 and 520 as well as sensor array 540 operate and function like their counterparts, devices 110 and 120, and sensor array 140, described above with respect to FIG. 1. Again, it should be noted that the two sensor support integrated circuit devices 510 and 520 may equivalently be replaced by a single integrated circuit that performs the functions of both sensor support integrated circuit devices 510 and 520. However, unlike fingerprint sensing device 10 shown in FIG. 1, the devices 510 and 520 are disposed on the bottom (the side which does not sense fingerprints), rather than the top, side of its base 500. The sensor array 540 is shown from its bottom side. In addition, a cable 530, which connects the sensing device 50 to an external host or other device (to supply power and receive the fingerprint image signals), is connected by contacts to the backside of base 500. By disposing all these components on the reverse side of the base 500, no bezel need necessarily be provided. Additionally, this allows the topside of the sensor array 540, the side that senses fingerprints, to be free of any physical interference. When attached to the bottom they are connected to the same type of contact pads on the base as a topside connection, except that the contact pads on the base are disposed on the bottom, rather than on the top.

Figure 6:
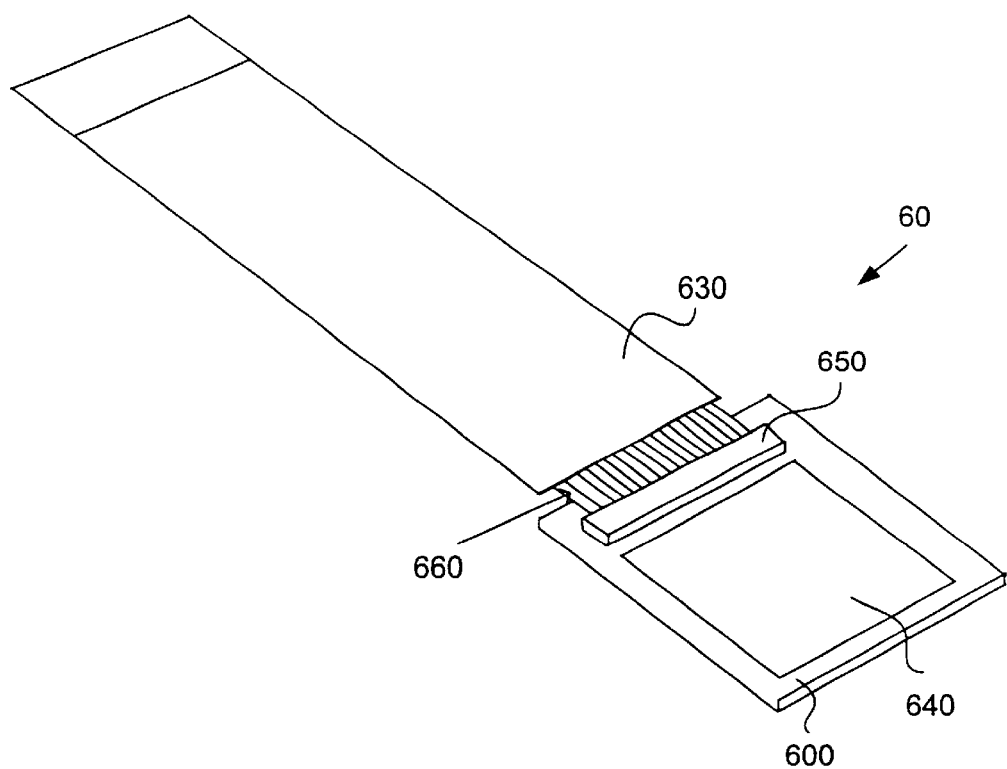
FIG. 6 illustrates a top perspective view of a fingerprint-sensing device according to at least one embodiment of the invention where only a single sensor support integrated circuit device is utilized.

FIG. 6 illustrates a top perspective view of a fingerprint-sensing device according to at least one embodiment of the invention where only a single sensor support integrated circuit device is utilized. The fingerprint sensing device 60 has components base 600, sensor array 640, cable 630 and attach pads 660 that correspond to components 100, 140, 130 and 160 of FIG. 1, respectively, and operate substantially the same thereto. Unlike fingerprint sensing device 10 of FIG. 1, fingerprint sensor array uses only a single sensor support integrated circuit device 650 to perform the addressing and processing of signals from sensor array 640. Integrated circuit device 650 is connected electrically to the sensor array 640 and the cable 630, but is fabricated independently of the sensor array 640 and is then attached to the base 600 in a manner similar to that described above. Device 650 addresses and processes every cell, both by row and column, of the sensor array 640 and replaces the two sensor support integrated circuit devices 110 and 120 of sensing device 10 in FIG. 1.

The sensing structure described above is formed using conventional semiconductor fabrication techniques, and as a result need not be further described, as will be apparent. In making the sensing structure, however, consideration should be made to the areas where the contact pads will exist on the sensing structure, thereby allowing the attachment of the sensor support integrated circuits. Also, while the above discussion was made with reference to a single sensing structure, and the associated other components that result in the fingerprint sensing device according to the present invention, it is understood that one of the advantages of the present invention is the ability to make many sensing structures simultaneously on the same wafer or panel. And, once so made, it is preferable to make a die of each sensing structure, and then connecting each sensor support integrated circuit and the cable to the sensing structure, as has been described.

Although the present invention has been described in detail with reference to the disclosed embodiments thereof, those skilled in the art will appreciate that various substitutions and modifications can be made to the examples described herein while remaining within the spirit and scope of the invention as defined in the appended claims. For instance, while the invention has been described passive elements used to implement the switching, these elements are may instead be active. Also, different electrical contact materials may be used. The base/substrate may be made from a roll material instead of wafers and sliced dies. Encapsulation and covering materials and techniques are other areas where changes may be made. Further, the sensor array could be formed separately from the base, and then subsequently connected to the base in the same manner as the sensor support integrated circuits. Accordingly, those skilled in the arts may make changes and modifications and employ equivalents without departing from the spirit of the inventions, as described by the claims below.

What is claimed is:

1. An apparatus for capturing an image of a textured surface, comprising:
    a base containing an electrical conductor interconnect structure therein;
    a sensor array disposed upon the base and electrically connected to the interconnect structure, the sensor array having cells configured to detect the textured surface and represent different portions of the textured surface with signals corresponding thereto; and
    sensor support integrated circuit devices electrically connected to the interconnect structure within the base and physically connected to the base, wherein the sensor support integrated circuit devices include:
        a first device configured to address each of a plurality of columns of cells in the sensor array, and
        a second device configured to address each of a plurality of rows of cells in the sensor array, and process the signal obtained from each addressed cell.

2. The apparatus according to claim 1 wherein the one or more sensor support integrated circuit devices includes a decoder to address the cells of the sensor array and further includes a comparator and an amplifier to process the signals obtained from the sensor array.

3. The apparatus according to claim 1 wherein the sensor array utilizes passive sensing cells.

4. The apparatus according to claim 1 further comprising:
    a cable electrically connected to the interconnect structure within the base, the cable configured to provide power to the sensor array and the devices, and to transmit the signals after the signals are processed within the second device.

5. The apparatus according to claim 4 wherein the cable is electrically connected to the interconnect structure using attach pads soldered to a set of contact pads disposed on the base.

6. The apparatus according to claim 3 wherein each cell of the sensor array is configured to react to a force exerted in its responsible locality, the force the result of a fingerprint feature pressed against the sensor array in the responsible locality.

7. The apparatus according to claim 6 wherein each cell comprises:
- a button configured to receive the force from the fingerprint feature;
- a flexible mechanical structure disposed below and coupled to the button, the flexible mechanical structure deforming due to an amount of force exerted on the button; and
- a contacting electrode disposed on the flexible mechanical structure, the electrode interfacing with a base contact electrode on the base, such that when the contacting electrode contacts the base contact electrode as a result of a sufficient amount of force, a current flow is caused upon application of an external voltage.

8. The apparatus according to claim 7 wherein the sensor support integrated circuit devices are connected to the base using one of wire bonding and direct attach bonding methods.

9. The apparatus according to claim 7 wherein the flexible mechanical structure is a beam or a diaphragm.

10. The apparatus according to claim 1 wherein the devices are electrically connected to the interconnect structure within the base using contact pads.

11. The apparatus according to claim 1 wherein the sensor array utilizes active sensing cells.

12. The apparatus according to claim 1 wherein the sensor support integrated circuit devices are active CMOS devices.

13. The apparatus according to claim 1 wherein the sensor array is covered by a covering material.

14. The apparatus according to claim 13 wherein the covering material is composed of a thin-film material.

15. The apparatus according to claim 14 wherein the thin-film material is a polymer.

16. The apparatus according to claim 1 wherein the sensor support integrated circuit devices are covered by a bezel structure.

17. The apparatus according to claim 16 wherein the bezel structure is composed of a moldable material.

18. The apparatus according to claim 17 wherein the moldable material is a plastic.

19. The apparatus according to claim 1 wherein the sensor support integrated circuit devices are disposed along an edge of the sensor array.

20. The apparatus according to claim 1 wherein the sensor array is disposed on a portion of the base and the sensor support integrated circuit devices are disposed on a different portion of the base.

21. The apparatus according to claim 1 wherein the first device includes a column decoder for decoding column addresses, and wherein the second device includes a row decoder for decoding row addresses, and a comparator and an amplifier to process the signals obtained from the sensor array.

22. The apparatus according to claim 1 wherein the rows of cells are disposed in a first direction and the columns of cells are disposed in a second direction perpendicular to the first direction.

23. The apparatus according to claim 22 wherein the first device is disposed along a first edge of the sensor array perpendicular to the first direction, and the second device is disposed along a second edge of the sensor array perpendicular to the second direction.

24. The apparatus according to claim 23 wherein the sensor array is disposed on a portion of the base and the first and second devices are disposed on a different portion of the base.

25. The apparatus according to claim 24 wherein the first device includes a column decoder for decoding column addresses, and wherein the second device includes a row decoder for decoding row addresses, and a comparator and an amplifier to process the signals obtained from the sensor array.

26. The apparatus according to claim 25 further comprising:
- a cable electrically connected to the interconnect structure within the base, the cable configured to provide power to the sensor array and the devices, and to transmit the signals after the signals are processed within the second device.

27. The apparatus according to claim 4 wherein the first device includes a column decoder for decoding column addresses, and wherein the second device includes a row decoder for decoding row addresses, and a comparator and an amplifier to process the signals obtained from the sensor array.

28. The apparatus according to claim 27 wherein the sensor array utilizes passive sensing cells.

29. The apparatus according to claim 28 wherein the first and second devices mounts are CMOS devices.

30. The apparatus according to claim 28 wherein each cell of the sensor array is configured to react to a force exerted in its responsible locality, the force the result of a fingerprint feature pressed against the sensor array in the responsible locality.

31. The apparatus according to claim 30 wherein each cell comprises:
- a button configured to receive the force from the fingerprint feature;
- a flexible mechanical structure disposed below and coupled to the button, the flexible mechanical structure deforming due to an amount of force exerted on the button; and
- a contacting electrode disposed on the flexible mechanical structure, the contacting electrode interfacing with a base contact electrode on the base, such that when the contacting electrode contacts the base contact electrode as a result of a sufficient amount of force, a current flow is caused upon application of an external voltage.

32. The apparatus according to claim 21 wherein the rows of cells are disposed in a first direction and the columns of cells are disposed in a second direction perpendicular to the first direction.

33. The apparatus according to claim 32 wherein the first device is disposed along a first edge of the sensor array perpendicular to the first direction, and the second device is disposed along a second edge of the sensor array perpendicular to the second direction.

34. The apparatus according to claim 21 wherein the sensor array utilizes passive sensing cells.

35. The apparatus according to claim 34 wherein each cell of the sensor array is configured to react to a force exerted in its responsible locality, the force the result of a fingerprint feature pressed against the sensor array in the responsible locality.

36. The apparatus according to claim 35 wherein each cell comprises:
- a button configured to receive the force from the fingerprint feature;
- a flexible mechanical structure disposed below and coupled to the button, the flexible mechanical structure deforming due to an amount of force exerted on the button; and a contacting electrode disposed on the flexible mechanical structure, the contacting electrode interfacing with a base contact electrode on the base, such that when the contacting electrode contacts the base contact electrode as a result of a sufficient amount of force, a current flow is caused upon application of an external voltage.

37. A method of obtaining a plurality of signals representative of a textured surface applied to a fingerprint sensor, the fingerprint sensor including a base containing an electrical conductor interconnect structure therein, a sensor array disposed upon the base and electrically connected to the interconnect structure, the sensor array having cells configured to detect the textured surface and represent different portions of the textured surface with signals corresponding thereto, and one or more sensor support integrated circuit devices electrically connected to the interconnect structure within the base and physically connected to the base, the at least one sensor support integrated circuit device configured to address the cells of the sensor array and process the signals obtained from the sensor array, the method comprising the steps of:

receiving at the one or more sensor support integrated circuits a start signal indicating that the sensor array should be scanned to detect.

receiving at the one or more sensor support integrated circuits a clock signal that is used to successively address each cell in the sensing array, such that for each cell that is addressed, there follows the steps of:

providing a voltage to the corresponding addressed column from the one or more sensor support integrated circuits;

receiving at the one or more sensor support integrated circuits from the sensor array the signal corresponding to the detected texture for the cell on the addressed row that corresponds to the addressed column;

processing, within the one or more sensor support integrated circuits, the signal to obtain an amplified signal; and transmitting the amplified signal from the one or more sensor support integrated circuits.

38. The method according to claim 37 wherein the one or more sensor support integrated circuit devices include a first device and a second device, wherein both the first device and the second device receive the start signal and the clock signal, wherein the first device provides the voltage, and wherein the second device processes the signal and transmits the amplified signal.

* * * * *